United States Patent [19]

Kung

[11] Patent Number: 5,389,471
[45] Date of Patent: Feb. 14, 1995

[54] WETTABLE BATTERY SEPARATOR FOR ALKALINE BATTERIES

[75] Inventor: James K. Kung, Lexington, Mass.

[73] Assignee: W. R. Grace & Co.-Conn., New York, N.Y.

[21] Appl. No.: 218,489

[22] Filed: Mar. 28, 1994

Related U.S. Application Data

[63] Continuation-in-part of Ser. No. 48,626, Apr. 16, 1993, Pat. No. 5,298,348.

[51] Int. Cl.6 ............................................. H01M 2/16
[52] U.S. Cl. ................................. 429/206; 429/251; 429/254; 429/250
[58] Field of Search ............... 429/206, 247, 249, 251, 429/254, 250; 428/105, 113, 280, 303

[56] References Cited

U.S. PATENT DOCUMENTS

| | | | |
|---|---|---|---|
| 2,812,379 | 11/1957 | Mendelsohn et al. | 136/143 |
| 2,930,829 | 3/1960 | Jacquier | 136/143 |
| 3,655,449 | 4/1972 | Yamamoto et al. | 136/107 |
| 3,915,750 | 10/1975 | Uetani et al. | 136/131 |
| 3,967,978 | 7/1976 | Honda et al. | 136/146 |
| 4,110,143 | 8/1978 | Cogliano et al. | 156/167 |
| 4,264,691 | 4/1981 | O'Rell et al. | 429/250 |
| 4,277,572 | 7/1981 | Fujiwara et al. | 525/61 |
| 4,330,602 | 5/1982 | O'Rell et al. | 429/206 |
| 4,361,632 | 11/1982 | Weber et al. | 429/145 |
| 4,734,344 | 3/1988 | Choi | 429/206 |

*Primary Examiner*—Anthony Skapars
*Attorney, Agent, or Firm*—John Dana Hubbard; William L. Baker

[57] ABSTRACT

A wettable battery separator for alkaline batteries is formed of a microporous plastic sheet selected from porous films, fabrics and papers. The separator is impregnated with a resin which has one or more carboxyl groups which have been neutralized by a base so as to form a salt. The resin is present in an amount from about 0.0001 to 3% by weight of the separator. Alkali resistant fillers may also be included.

16 Claims, No Drawings

WETTABLE BATTERY SEPARATOR FOR ALKALINE BATTERIES

This application is a continuation-in-part of U.S. patent Application Ser. No. 08/048,626, filed on Apr. 16, 1993, now U.S. Pat No. 5,298,348.

The present invention relates to a separator for alkaline batteries. More particularly, it relates to wettable separators for alkaline batteries.

BACKGROUND OF THE INVENTION

Alkaline batteries have become increasingly more popular because of their high energy density. As such, these batteries are increasingly used in applications normally reserved for the traditional lead-acid battery systems.

In order to achieve extended battery life and efficiency in alkaline systems, the use of battery separators is required and the use of battery interseparators, as well, is preferred. The battery separators are located between the positive and negative plates so as to provide, (1) a separation between the electrodes of opposite charge, (2) an electrolyte reservoir, (3) a uniform electrolyte distribution across the electrode surface so as to permit uniform current density and (4) a space for electrode expansion.

Battery separators and interseparators used in alkaline batteries at present are commonly formed of a polyolefin, preferably polypropylene, polyamide or nylon non-woven sheet.

Other separators in use in alkaline systems today are shown in U.S. Pat. Nos. 4,264,691 and 4,330,602 in which the separator/interseparator is formed of synthetic pulp, alkali resistant inorganic filler and a long fiber of polyester, polyacrylic, polyamide or polyolefin materials. Another type of separator is a microporous plastic film such as is described in U.S. Pat. No. 3,351,495.

Until now, these separators have been suitable for existing technology.

Battery makers now require a separator with better performance characteristics than is currently available with the current separators, especially those based upon nylon or treated polypropylene. Preferably, they desire greater and faster wettability of the separator by the alkaline electrolyte.

The present invention overcomes the problems inherent in the currently used separators and provides a wettable sheet material with the desired tensile strength, chemical inertness, electrolyte absorption and electrical resistance properties which is usable in alkaline batteries.

OBJECT OF THE INVENTION

It is an object of the present invention to provide a wettable sheet material useful as a separator or interseparator in alkaline batteries.

It is another object of the present invention to provide a sheet material which is wettable by electrolyte and has good electrolyte absorption and chemical inertness in an alkaline battery system.

Another object of the present invention is to provide a wettable separator suitable for use in alkaline battery systems comprised of one or more fibers, and a carboxyl group containing resin binder/wetting agent.

An additional object of this invention is to provide a battery separator or interseparator comprised of synthetic pulp, one or more short fibers, one or more long fibers and a carboxyl group resin binder/wetting agent. The separator has excellent tensile strength, wicking properties, wettability and alkali resistance.

It is a further object of the present invention to provide a battery separator for alkaline batteries formed of synthetic pulp, one or more short fibers, one or more long fibers, wherein at least some of the long fibers are water swellable and an acrylic resin binder/wetting agent.

An additional object of the present invention is to provide a separator for alkaline batteries comprised of a microporous, plastic sheet material and a carboxyl containing wetting agent coated thereon.

An even further embodiment of the present invention is to provide improved wettability to existing alkaline separators by the incorporation of a carboxyl group containing wetting agents, wherein the carboxyl groups have been neutralized by treatment with a base material, preferably so as to form a salt.

SUMMARY OF THE INVENTION

A sheet material suitable for use in alkaline battery systems as a battery separator or interseparator is described which is formed of a microporous sheet and from about 0.0001 to 3 percent of a carboxyl group containing a wetting agent. Wherein the carboxyl group is neutralized with a base material. The sheet may be formed of a porous film or it may be formed of a fibrous material such as a woven or nonwoven fabric or synthetic paper.

DETAILED DESCRIPTION OF THE INVENTION

All measurements stated in percent in this application, unless otherwise stated, are measured by weight based upon 100% of the finished product weight. Thus, for example 30% represents 30 weight parts out of every 100 weight parts of the finished product.

The present invention relates to a battery separator formed of a microporous plastic sheet coated or impregnated with a carboxyl group containing resin. The sheet may be a microporous plastic film, fabric (woven or nonwoven) or paper. Such materials are well known and commercially available as described herein.

The carboxyl group containing resin acts as a wetting agent and in some cases, such as the paper, additionally as a binder to hold the fibers together. The resin may be any polymer which contains one or more carboxyl groups which are capable of reacting with a base material. Preferred resins have more than one, preferably more than two carboxyl groups. It is preferred that the groups be attached along the backbone of the polymer as this allows for a large number of sites for each polymer chain. A simplified diagram of such a polymer is shown below:

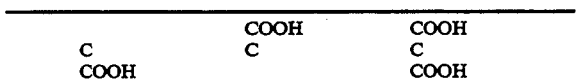

It is preferred to use a homopolymer type of resin rather than a copolymer or terpolymer.

The carboxyl group is preferably a carboxylic acid such as acrylic acid, methacrylic acid, the aconic acid and fumaric acid. More preferably the group is acrylic acid.

The carboxyl groups must be arranged on the polymer so as to be capable of reacting with a base, preferably a metal hydroxide or other alkaline material. Preferably, the base is potassium hydroxide. The alkaline material neutralizes the carboxyl group forming in most instances a salt.

The resin which is used to impregnate or saturate the microporous sheet is preferably an acrylic resin which has one or more pendant carboxylic groups. One preferred acrylic resin is known as CARBOPOL and is sold by B.F. Goodrich. It is an acrylic acid homopolymer, typically of high molecular weight. The preferred acrylic acid homopolymer used in the present invention should have a molecular weight (average) of from about 200,000 to about 2,000,000. Preferably, the resin has one or more carboxylic acids attached to it, either at the ends of the polymer or along the length of the polymer chain.

The selected resin should be dissolvable in a solvent, preferably water. To prepare the resin, such as the CARBOPOL resin, for use in the invention, one dilutes or dissolves the resin in the solvent and raises the pH of the solution to above 6. Preferably, the pH is raised by the addition of a metal hydroxide such as potassium hydroxide, or other alkaline materials. The carboxylic groups of the polymer react with the base to form salts such as potassium salts when potassium hydroxide is used. These salts provide the desired wettability characteristics.

The amount of resin which is present in the sheet, after impregnation and drying, varies from about 0.0001 to about 3% by weight of the sheet. This small amount has been shown to provide good binding properties for the fibrous plastic papers allowing the sheet to be flexible and formstable. Moreover, the addition of a small amount of resin binder improved the wetting ability of the sheet whether it was a film, a fabric or paper. (e.g. ability to quickly and completely absorb electrolyte).

In a first embodiment of the present invention, the separator is a fibrous sheet material, more preferably a paper comprising a mixture of polyolefin synthetic pulp, of one or more fibers, and from about 0.0001 to 3 percent by weight of the sheet of resin binder. Preferably some of the fibers are long fibers. Additionally, it is preferred that one of the fibers be water swellable.

The synthetic pulp useful in the present invention is a polyolefin of short fibers having a fiber size and shape similar to that of cellulose pulp. Such synthetic pulps are described in U.S. Pat. Nos. 4,264,691 and 4,330,602, the teachings of which are incorporated herein by reference.

The length of the synthetic pulp is from about 0.8 to 5 millimeters, preferably from about 1 to 4 millimeters. The preferred pulp is a polyethylene based pulp. Other pulps are equally useful and may be made of other polyolefins such as polypropylene. Pulp fibers with a high degree of branching or fibrillation are most preferred in the present invention.

The one or more fibers used in the present invention are formed of synthetic polymers. Preferably at some or all of which are water swellable. More preferably, the invention contains at least two types of fibers; one water swellable, and at least one other being nonwater swellable.

The water swellable fiber, if used, is formed of a material such as a vinyl alcohol polymer (PVA) or a copolymer of a polyvinyl chloride (PVC) and a polyvinyl alcohol or a grafted copolymer comprising a vinyl chloride backbone grafted with a vinyl alcohol polymer. Such fibers are commercially available. A commercially available example of a vinyl alcohol polymer water swellable fiber is MEWLON SML by Unitika Kasei, Ltd. An example of a commercially available polyvinyl chloride/polymer alcohol copolymer is sold by Kohjin Co. Preferably, this fiber is a "long" fiber having a length of from about 3 to 38 millimeters (0.10 to 1.5 inches).

The non swellable fiber(s) can be a nonwater swellable PVA, such as MEWLON F, by Unitika Kasei, Ltd., or other nonwater swellable fibers such as polyester, nylon, polyacrylic, polyamide, polyolefin, polyvinyl chloride bicomponent fibers or mixtures thereof. Such fibers are well known and commercially available.

Some or all of the fibers may be along fiber (as described above), especially where no water swellable fibers are used.

Preferably, the fiber component is a blend of several different fibers. Typically, a blend of polypropylene, polyethylene, nonwater swellable PVA, a bicomponent fiber and a water swellable PVA fiber are used.

By "bicomponent" it is meant a fiber which has core formed of one polymer and an outer sheath, jacket or coating formed of a different polymer. Typically, the outer layer is formed of a polymer having a lower melting point than the polymer of the core.

A preferred bicomponent fiber is based upon a polypropylene core covered a polyethylene jacket. Such fibers are sold by DIAWABO Co. Ltd. of Japan and are known as the DIAWABO NBF fibers. Other suppliers are also available and known to those skilled in the art.

Most, if not all of the fibers should have a denier of from about 1 to about 12 and a length of 3 to 10 millimeters. The total amount of these fiber should constitute from 80 to 90% of the sheet material. The remainder of the fibers being "long" fibers, having a length of from about 3 to about 38 millimeters, and as described above, may be water swellable, nor nonwater swellable or a blend of both and can be selected from the synthetic fibers described above.

Optionally, an inorganic alkali resistant filler may be used in the present invention. The alkali resistant inorganic filler can be any particulate material which is chemically inert to alkaline electrolytes. Alkali resistant inorganic fillers suitable for use in the present invention include for example, titanium dioxide, alumina, calcium oxide, calcium hydroxide, calcium titanate, potassium titanate, magnesium hydroxide, magnesium oxide calcium hydroxide or zirconium hydroxide and admixtures thereof. Of course, any other alkali resistant filler, which is compatible with the other ingredients used in the sheet of the present invention and known to one skilled in the art can be used as well. A preferred filler is potassium titanate. Another preferred filler is titanium dioxide. The filler preferably has a particle size of from about 0.001 to about 1 microns, a surface area of from about 5 to about 200 square meters per gram and a pore volume of from about 0.01 to about 1 cc per gram when present, the filler should be in an amount from 5 to 100 weight percent of the fibers in the separator.

Sheet material formed in accordance with the present invention are porous materials having a median pore diameter of less than 40 microns and a maximum pore diameter of no more than about 140 microns. Additionally, wherein the form of a paper it may have a ream weight of from about 15 to 100 pounds, porosity of from about 50 to 90%, an electrolyte retention capability of from 200 to 700% and an electrical resistance of less than 5 ohms/cm.

The process by which the synthetic paper sheet of the present invention is formed is similar to that described in U.S. Pat. Nos. 4,264,691 and 4,330,602 which are incorporated by reference herein. The process is carried out on normal paper-making machinery, such as a rotoformer or Fourdinier paper machine. A slurry is formed in a conventional paper-making pulper first by charging the synthetic pulp with water and pulping the material until it is thoroughly dispersed. Various dispersants may be added if necessary or desired, or more preferably the pulp may optionally contain a dispersant. The pulper content is then discharged into the chest of a rotoformer or a Fourdinier paper machine. A water swellable long fiber if used, is added to the chest and mixed for a sufficient amount of time so as to allow the fiber to swell. Preferably, the slurry is warmed to room temperature or greater to aid in the swelling of the fiber. Next one or more nonwater swellable fibers are mixed into the chest. After thoroughly mixing the components in the chest, ground alum, (aluminum sulphate) preferably iron free, is added. The aqueous slurry is then transferred from the chest to a dilution box upstream of a web forming headbox. There, the mixture is diluted with water until the solids concentration is less than 5 percent preferably less than 1 percent. The mixture is then transferred to the headbox and a web is formed on the rotoformer or Fourdinier machine. A lump breaker operating at 20 to 80 psi. smooths the upper surface of the web. The web is transferred from the rotoformer or Fourdinier machine to an oven and/or one or more drying cans where the web is dried. During the drying or subsequent thereto, the web may optionally be heated to a temperature of from about 125° C. to 150° C. to allow for the partial fusing of the synthetic pulp fibers.

The thickness of the resultant web is directly related to the rate at which the slurry is deposited onto the web forming apparatus, the solids concentration at that moment and the speed of the web forming apparatus. The sheet material should have a thickness of less than 20 mils. Preferably the resultant sheet material should be less than 12 mils, requiring therefore that the deposition of the slurry be at a grammage of less than about 120 grams per square meter (gm/m$^2$), preferably 40 to 120 gm/m$^2$. Of course, should a thicker sheet material be desired, one could easily increase the deposition grammage until a sheet of desired thickness is achieved.

The dried web may be calendered at sufficient pressure and temperature to form a sheet having a thickness of less than 12 mils, preferably 5 to 10 mils.

The use of a retention aid is not required in the present invention especially when a water swellable fiber is used as it has been found that the water swellable fiber attracts and retains any filler, if used, to its surface so that the amount of filler lost during drying is substantially reduced. One could use retention aids in the process to reduce the loss of filler during drying especially if no water-swellable fiber is used. If used, preferably the slurry is treated with an ionic retention aid such as a cationic polyacrylamide and then an anionic polyacrylamide retention aid. An example of a cationic acrylamide useful in this invention is RETEN 210, a product of Hercules, Inc. A suitable anionic retention aid is RETEN 421 or 521, an anionic acrylamide copolymer of Hercules, Inc. Typical concentrations are 0.04% in water at 600 to 800 ml/minute for the cationic retention aid and 0.025% in water at 600 to 800 mil/minute for the anionic retention aid.

Other aids, such as surfactants to improve the electrical resistance of the sheet material, and wetting agents are also usable in the present invention, so long as they do not have an adverse effect on battery performance or life.

A second embodiment of the present invention is the microporous film type sheet as disclosed in U.S. Pat. No. 3,351,495 which is incorporated herein by reference in its entirety. The film is formed by extruding one or more plastics preferably polyethylene or polypropylene with a pore forming agent (such as mineral oil) through a sheet die and/or calender roll and then extracting some or all of the pore forming agent to create the microporous structure. Optionally and preferably, an inorganic alkali resistant filler, as described above with the first embodiment, is used. Such materials are commercially available, such as 3A or DARAMIC ® separators from W. R. Grace & Co.-Conn.

A third embodiment of the present invention is the fabric type of sheet which can be a woven fabric such as rip stop nylon or a nonwoven such as a spun bonded polyester fabric. The materials are commercially available such as REEMAY or TYVEK nonwoven fabrics.

After formation of the sheet, regardless of whether it is a paper, film or fabric, it is saturated, coated, or impregnated with the wetting agent and then dried in an oven.

Alternatively, and especially with the synthetic paper embodiment the resin can be applied after the sheet formation, but prior to drying by a sizing step. "Sizing" refers to the addition of a chemical to the sheet during processing. The resin is simply sprayed or otherwise applied to sheet, preferably before calendaring in an amount sufficient to saturate the entire sheet.

The following examples are provided to explain and more fully teach the present invention. They are not intended to restrict or limit the scope of the claims of the present invention.

EXAMPLE 1

A sheet according to the present invention was formed of the following components:

15% synthetic polyethylene pulp;

30% nonwater swellable polyvinyl alcohol fiber (1 dernier by 3 millimeters);

10% water swellable polyvinyl alcohol long fiber;

25% polypropylene fiber (average length 6 millimeters);

20% bicomponent fiber formed of a polypropylene core and polyethylene sheath, (2 dernier by 3 to 5 millimeter length). (all percentages by weight of the sheet).

The components were added to a wet laid paper making machine and formed into a sheet about 15 mils mm in thickness. The sheet was dried and then impregnated with an aqueous solution of CARBOPOL acrylic resin and dried. The amount of resin in the dried sheet was about 0.01% of the sheet weight.

The sheet was used as a separator in a nickel/metal hydride battery and was tested against a nickel/metal hydride battery using a microporous nylon separator. Both batteries were charged to capacity and then stored for 30 days after which their energy capacities were determined.

The control battery with the nylon separator retained 50% of its energy. The battery using the separator of the present invention retained better than 60% of its energy.

The present invention was shown to provide excellent separator properties and provided the battery with improved storage capabilities over the existing separators.

EXAMPLE 2

A separator based upon a synthetic paper of polyethylene pulp and polypropylene fiber was treated with 0.005% by weight solution of a carboxyl group containing acrylic resin [CARBOPOL resin], reacted with potassium hydroxide, rinsed and then dried. A similar untreated separator was tested along with the treated separator by placing a same size sheet of each separator on top of a bowl of alkaline electrolyte (potassium hydroxide [KOH]). The time until each separator was completely wetted was recorded. The treated separator was found to wet out (i.e, become completely absorbed in the electrolyte) in 3 minutes as compared to the untreated separator which after 60 minutes had still not wet out.

While this invention has been described with reference to its preferred embodiments, other embodiments can achieve the same result. Variations and modifications of the present invention will be obvious to those skilled in the art and it is intended to cover in the appended claims all such modifications and equivalents as fall within the true spirit and scope of this invention.

What I claim:

1. A separator for an alkaline battery system comprising a porous sheet selected from the group consisting of microporous films, fabrics, and synthetic papers and wherein the sheet is saturated with a resin containing one or more carboxyl groups which have been neutralized with a base so as to form a salt wherein the resin is present in an amount of from about 0.0001 to 3% by weight of the sheet.

2. The separator of claim 1 further comprising one or more alkali resistant inorganic fillers present in an amount from about 0.5 to about 65 percent by weight of the sheet.

3. The separator of claim 2 wherein the filler is selected from the group consisting of titanium dixoide, alumina, magnesia, potassium titanate, zirconium hydroxide, magnesium hydroxide and mixtures thereof.

4. The separator of claim 1 wherein the sheet has a medium pore diameter of less than 40 microns, a maximum pore size of about 140 microns, a ream weight of from 15 to 80 pounds, porosity of from 40 to 90%, an electrolyte retention capability of from 200 to 700% and an electrical resistance of less than 5 ohms-cm.

5. The separator of claim 1 wherein the resin is formed of a high molecular weight acrylic acid homopolymer having one or more carboxyl groups.

6. A separator for alkaline batteries comprising a microporous plastic sheet formed of a nonwoven fabric selected from the group consisting of polyolefins, polyamides and nylon fibers, wherein the sheet is impregnated with a resin containing one or more carboxyl groups which have been neutralized with a base so as to form a salt and wherein the resin is present in an amount of from about 0.0001 to about 3% by weight of the sheet.

7. The separator of claim 6 wherein the carboxyl groups have been neutralized with a metal hydroxide.

8. The separator of claim 6 where in the resin is an acrylic homopolymer.

9. The separator of claim 6 wherein the one or more carboxyl groups have been neutralized with potassium hydroxide.

10. A battery separator for alkaline batteries comprising: a microporous sheet formed of a polyolefin synthetic pulp, a nonwater swellable fiber selected from the group consisting of nylons, polyesters, polyolefins, polyvinyl alcohols, polyacrylics, polyamides, polyvinyl chlorides, bicomponent fibers or mixtures thereof and a water swellable polyvinyl alcohol fiber, wherein the sheet is impregnated with an acrylic resin which resin contains one or more carboxyl groups which have been neutralized with a base so as to form a salt, the resin being present in an amount of from 0.0001 to about 3% of the sheet, all percentages being by weight of the separator.

11. The separator of claim 10 wherein the pulp is a polyethylene fiber having a length of from 0.8 to 5 millimeters, the non water swellable fiber has a size of about 3 to 10 millimeters, and the water swellable fiber has a size of from about 3 millimeters to 38 millimeters.

12. The separator of claim 10 further comprising one or more alkali resistant fillers present in an amount from about 5 to about 100 weight percent of the fiber components of the sheet.

13. The separator of claim 12 wherein the one or more fillers are selected from the group consisting of titanium dioxide, alumina, magnesia, potassium titanate, zirconium hydroxide, magnesium hydroxide, calcium hydroxide and a mixture thereof.

14. An alkaline battery comprising a positive electrode, negative electrode, an alkaline based electrolyte, and a separator between the positive and negative electrodes wherein the separator is formed of a sheet product according to claim 10.

15. A battery separator for alkaline batteries comprising a microporous plastic film containing a wetting resin formed of a resin having one or more carboxyl groups, wherein the one or more carboxyl groups have been neutralized with a base so as to import wettability characteristics to the film when inserted into an alkaline electrolyte.

16. The separator of claim 15 wherein the resin is an acrylic homopolymer; the film is a microporous polyolefin sheet containing one or more inorganic, alkali resistant fillers and the base is a metal hydroxide.

* * * * *